United States Patent [19]

Cassidy et al.

[11] Patent Number: 5,429,663
[45] Date of Patent: Jul. 4, 1995

[54] REMOVAL IN AIRCRAFT OF COMPONENTS FROM FLUID MIXTURES

[75] Inventors: Ronald F. Cassidy, Hampshire, England; Donald H. White, Jr., Homer, N.Y.; Gabriel L. Popa, Rodgau, Germany

[73] Assignee: Pall Corporation, Glen Cove, N.Y.

[21] Appl. No.: 69,508

[22] Filed: Jun. 1, 1993

[30] Foreign Application Priority Data

Jun. 1, 1992 [GB] United Kingdom ............. 9211558

[51] Int. Cl.⁶ .................. B01D 53/047; B01D 53/22
[52] U.S. Cl. .......................... 95/21; 95/22; 95/97; 95/104; 95/122; 96/113; 96/117; 96/144; 55/275
[58] Field of Search ............. 55/274, 275; 95/21, 95/95, 97, 98, 104, 105, 117, 122; 96/108, 113, 117, 144

[56] References Cited

U.S. PATENT DOCUMENTS

| | | | |
|---|---|---|---|
| 1,695,554 | 12/1928 | Markels | 96/113 |
| 3,192,686 | 7/1965 | Berkey et al. | 95/21 |
| 3,237,377 | 3/1966 | Skarstrom | 95/97 |
| 3,922,149 | 11/1975 | Ruder et al. | 55/21 |
| 4,162,146 | 7/1979 | Seibert | 96/113 |
| 4,295,863 | 10/1981 | Lattuada | 95/98 X |
| 4,537,607 | 8/1985 | Rogers et al. | 96/113 |
| 4,661,124 | 4/1987 | Hamlin et al. | 96/113 X |
| 4,687,573 | 8/1987 | Miller et al. | 210/143 |
| 4,927,434 | 5/1990 | Cordes et al. | 96/113 X |
| 5,271,842 | 12/1993 | Degen et al. | 210/649 |

FOREIGN PATENT DOCUMENTS

| | | | |
|---|---|---|---|
| 0313504 | 10/1988 | European Pat. Off. | |
| 0375220 | 12/1989 | European Pat. Off. | |
| 2512088 | 9/1975 | Germany | 55/274 |
| 61-222522 | 10/1986 | Japan | 95/122 |
| 61-119326 | 5/1989 | Japan | 96/144 |
| 361198 | 3/1991 | Japan | |
| 0799796 | 1/1981 | U.S.S.R. | 96/144 |
| 9113803 | 9/1991 | WIPO | |

Primary Examiner—Robert Spitzer
Attorney, Agent, or Firm—Leydig, Voit & Mayer

[57] ABSTRACT

The removal of components from fluid mixtures in aircraft utilizes an adsorbent bed which is regenerated by passing dry ambient air through the adsorbent bed when the aircraft reaches a height at which such dry ambient air is available. An example of mixtures that can be treated in this way are water/oil mixtures, air/water vapor mixtures and air/odor mixtures. By periodically regenerating the adsorbent bed in this way, an adsorbent bed of small size can be used but yet have a substantial life.

24 Claims, 4 Drawing Sheets

5,429,663

REMOVAL IN AIRCRAFT OF COMPONENTS FROM FLUID MIXTURES

BACKGROUND TO THE INVENTION

1. Field of the Invention

The invention relates to methods of and apparatus for removing in aircraft at least one specified component from a fluid mixture.

In aircraft, there are a number of applications where it may be desirable for at least one specified component to be removed from a fluid mixture. For example, in aircraft, pressurized air is often derived from an engine bleed source, which is itself derived from the ambient air. This air is passed through lines within the aircraft to various equipment where it may have various uses. For example, fluid reservoirs may be pressurized with air. At low altitudes, this pressurized air can contain a significant proportion of water vapor. This can be a problem because the pipes and the equipment can be adversely affected by the wetness.

In another application, lubricating oils used in aircraft are frequently contaminated with water. Typically, it is such contamination that initiates corrosion processes, which lead to .the breakdown of metal components unless controlled. A further application is the presence of odors in cabin air.

2. Brief Review of the Prior Art

Adsorbent beds are capable of removing components such as water vapor and odors from air and removing water from oil, but they suffer from the problem that in order to give a substantial life, the adsorbent bed must be of substantial size. In aircraft, space is at a premium and so it is not normally possible to utilize an adsorbent bed which has a substantial life; rather, adsorbent beds are used which meet the space requirements but which require frequent renewal.

SUMMARY OF THE INVENTION

According to a first aspect of the invention, there is provided a method of removing in aircraft at least one specified component from a fluid mixture, the method comprising feeding the mixture to an adsorbent bed, adsorbing the at least one component in the adsorbent bed, passing the remaining fluid from the adsorbent bed and, when the aircaft reaches an altitude at which dry ambient air is available, feeding said dry ambient air to the adsorbent bed to desorb the at least one component from the bed, the air and the desorbed at least one component then being vented. According to a second aspect of the invention, there is provided aircraft apparatus for removing at least one specified component from a fluid mixture and comprising an adsorbent bed for adsorbing said at least one specified component, an inlet for feeding said mixture to said adsorbent bed, an outlet for passing fluid from the adsorbent bed after said adsorption, an inlet for feeding ambient air to the adsorbent bed to desorb said at least one specified component from the adsorbent bed, the ambient air inlet being controlled by control means which permit the passage of air to said adsorbent bed to desorb said adsorbent bed only when the aircraft reaches an altitude at which dry ambient air is available, and a vent for venting ambient air and desorbed at least one component from the adsorbent bed during said desorbing flow of dry ambient air.

Thus, by the use of an adsorbent bed and regeneration when the aircraft is at altitude, the adsorbent bed can be sufficiently small to meet the space requirements of aircraft and yet have a much greater life than would be the case if the adsorbent bed had to be replaced once completely contaminated.

The following is a more detailed description of some embodiments of the invention, by way of example, reference being made to the accompanying drawings in which:

DESCRIPTION OF THE PREFERRED EMBODIMENTS

Figure 1A:
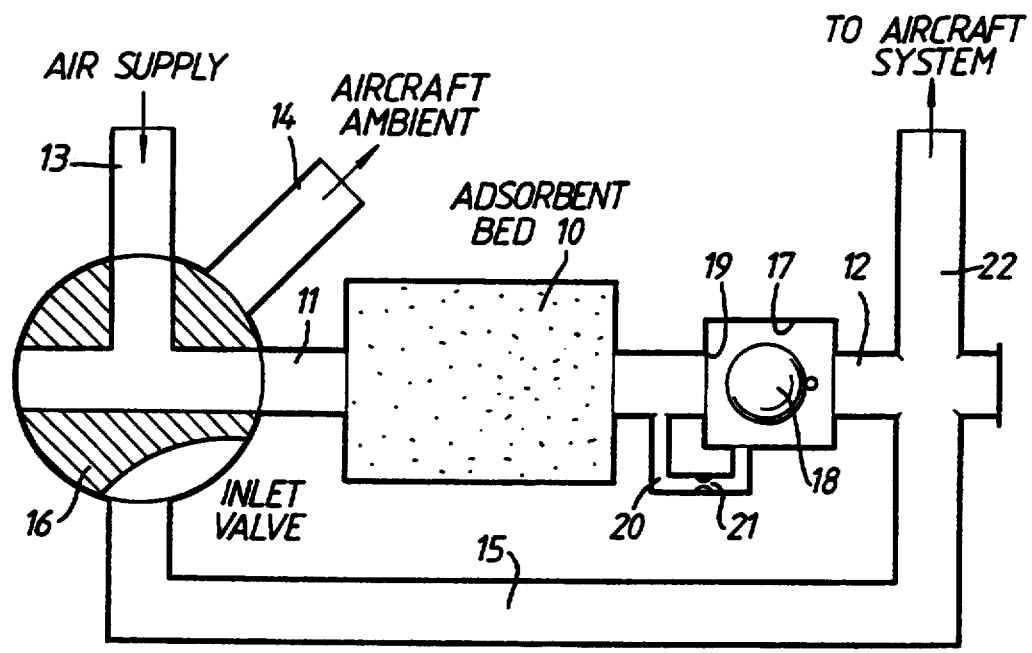
FIG. 1a is a schematic view of apparatus for the supply of dry pressurized air to equipment in an aircraft including an adsorbent bed and a valve shown in a first position in which a pressurized air supply is connected to the adsorbent bed.
Figure 1B:
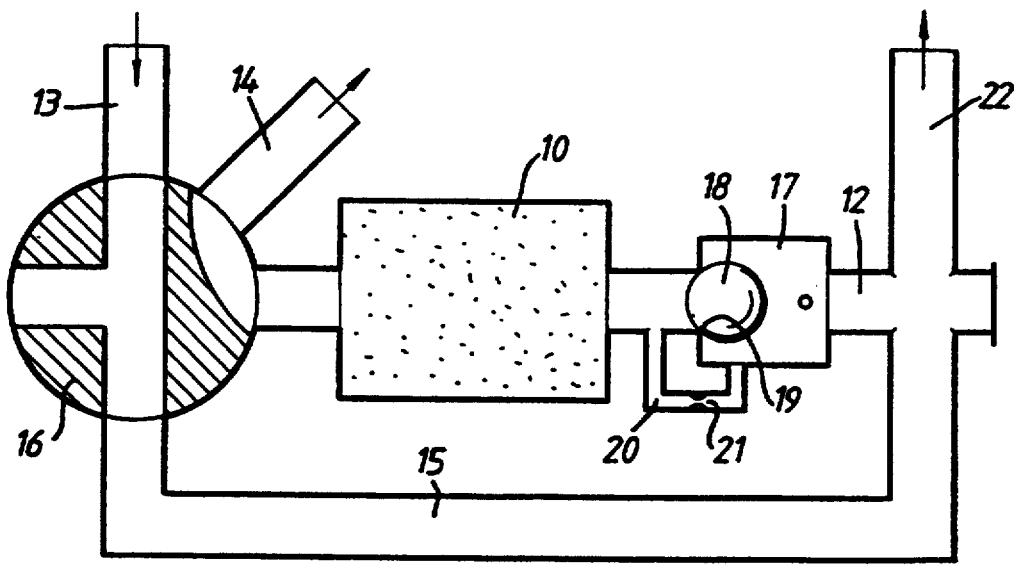
FIG. 1b is a similar view to FIG. 1 but showing the valve in a second position in which the pressurized air supply is connected to a by-pass.

Referring first to FIGS. 1a and 1b, the apparatus for the supply of dry pressurized air comprises an adsorbent bed 10 which may be of any known kind. For example, the adsorbent bed may be of the kind shown in U.S. Pat. No. 4,687,573. The adsorbent bed 10 has an inlet 11 and an outlet 12.

The apparatus also includes an air inlet 13, a vent 14 and a by-pass 15. A rotary valve 16 is provided which is movable between a first position shown in FIG. 1a in which the air inlet 13 is connected to the adsorbent bed inlet 11, with the vent 14 and the by-pass 15 closed, and a second position shown in FIG. 1b in which the air inlet 13 is connected to the by-pass 15 but shut off from the adsorbent bed inlet 11 and in which the adsorbent bed inlet 11 is connected to the vent 14.

The adsorbent bed outlet 12 is connected to the by-pass 15 downstream of the rotary valve 16. The outlet 12 includes an enlarged section 17 containing a ball 18 which acts to prevent reverse flow through the outlet 12 by engaging against a seat 19. A passage 20 by-passes the ball 18 and includes an orifice 21. The function of these parts will be described below.

A supply line 22 leads from the junction of the outlet 12 and the by-pass 15.

In use, the apparatus is installed in an aircraft. The air inlet 13 is connected to a source of pressurized air which may, for example, be a bleed from the aircraft engine. The vent 14 is connected to the ambient air and the supply line 22 is connected to equipment within the aircraft requiring the supply of pressurized air.

Before and during take-off, the rotary valve 16 has the position shown in FIG. 1a. In this position, air from the supply, which will be water vapor laden, is passed to the adsorbent bed 10. In the adsorbent bed, water vapor is adsorbed and dry air exits the adsorbent bed 10 through the outlet 12, moving the ball 18 to the open position shown in FIG. 1a. The dry air then passes through the supply line 22 to the equipment.

As the aircraft gains altitude, the supply of pressurized air becomes water vapor free. When this occurs, the rotary valve 16 is moved to the second position shown in FIG. 1b. In this position, the now-dry pressurized air passes straight from the air inlet 13 to the by-pass 15 and thence to the supply line 22 and the equipment.

Some air enters the outlet 12 and acts to push the ball 18 against the seat 19 so closing the outlet 12. Air does, however, pass through the passage 20 and the orifice 21. The orifice 21 regulates the flow rate of dry ambient air fed to the adsorbent bed 10 to reduce the pressure of the air to a pressure close to the ambient air pressure around the aircraft.

This has the effect of desorbing the adsorbent bed 10. By reducing the pressure, a part of the adsorbed water is desorbed because the equilibrium adsorption capacity decreases at expansion of the vapor phase. Further water is desorbed by the purged flow which is essentially dry.

In this way the adsorbent bed 10 is regenerated.

As the aircraft descends to a level at which the air supply is water vapor-laden, the rotary valve 16 is moved from the second position shown in FIG. 1b to the first position shown in FIG. 1a. Water vapor is then adsorbed as described above.

The change from the first valve position to the second valve position may take place at, say, 6,000 meters and return movement from the second position to the first position may take place at 4,500 meters. The pressure can be chosen as required to depend on system susceptibility, pressure and temperature of bleed air supply at various altitudes and other system parameters.

Figure 2:
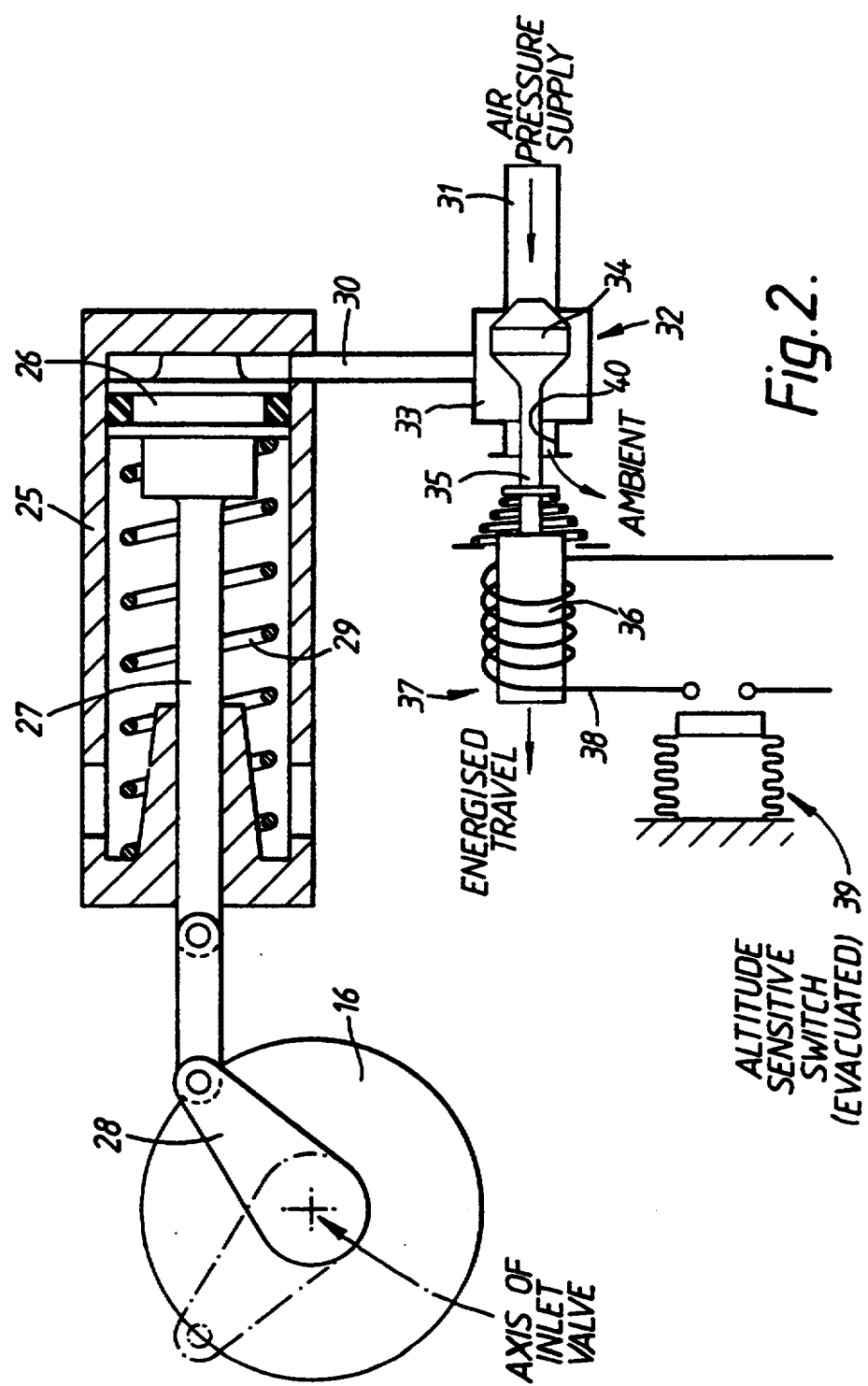
FIG. 2 is a schematic view of an actuator and a control system for the actuator for controlling the operation of the valve shown in FIGS. 1a and 1b to move between the first and second positions.

The rotary valve 16 is preferably moved between the first and second positions automatically. A system for accomplishing this is shown in FIG. 2.

The system comprises a cylinder 25 which is closed at one end and which contains a piston 26. The piston is connected to a rod 27 which passes through the open end of the cylinder 25 to connect to a crank 28 attached to the rotary valve 16. The piston 26 is urged towards the closed end of the cylinder 25 by a coil spring 29.

An inlet 30 is connected to the closed end of the cylinder 25 and is in turn connected to a pressurized air supply line 31. A control valve 32 is provided between the line 31 and the inlet and comprises a chamber 33 containing a valve member 34 attached to one end of a rod 35. The other end of the rod 35 is connected to the core 36 of a solenoid 37. The solenoid in turn includes a winding 38 which is connected to an altitude sensitive switch 39.

In use, the switch 39 closes at a predetermined altitude in ascent to connect the winding 38 to a source of electricity (not shown). This energizes the solenoid 37 and causes the core 36 to travel, so moving the valve member 34 via the rod 35. This results in the member 34 moving from the position shown in FIG. 2 in which the member prevents interconnection between the supply line 31 and the inlet 30. In addition, this movement causes the member 34 to close a vent 40 provided in the chamber 33.

Air thus passes from the supply line 31 through the inlet 30 to the closed end of the cylinder 25. This causes the piston 26 to move against the action of the spring 29 and so, via the rod 27 and the crank 28, move the rotary valve 16 from the first to the second position.

When the altitude falls below a predetermined level in descent, the switch 39 opens, breaking the circuit to the winding 38. The solenoid 37 is thus de-energized and the core 36 returns to its original position. This causes the member 34 to close the supply line 31 and to open the vent 40. The closed end of the cylinder 25 is thus vented, causing the piston 26 to make a return movement under the action of the spring 29. This rotates the rotary valve 16 from the second position to the first position via the rod 27 and the crank 28.

It will be appreciated that this is but one example of an actuation system. Other systems are possible.

It is possible that, in some circumstances, the time spent by the aircraft at altitude, or the ambient conditions, may not be sufficient completely to regenerate the adsorbent bed. Under these circumstances, it may be necessary to regenerate the bed while the aircraft is on the ground. A system for this is shown in FIG. 3.

Figure 3:
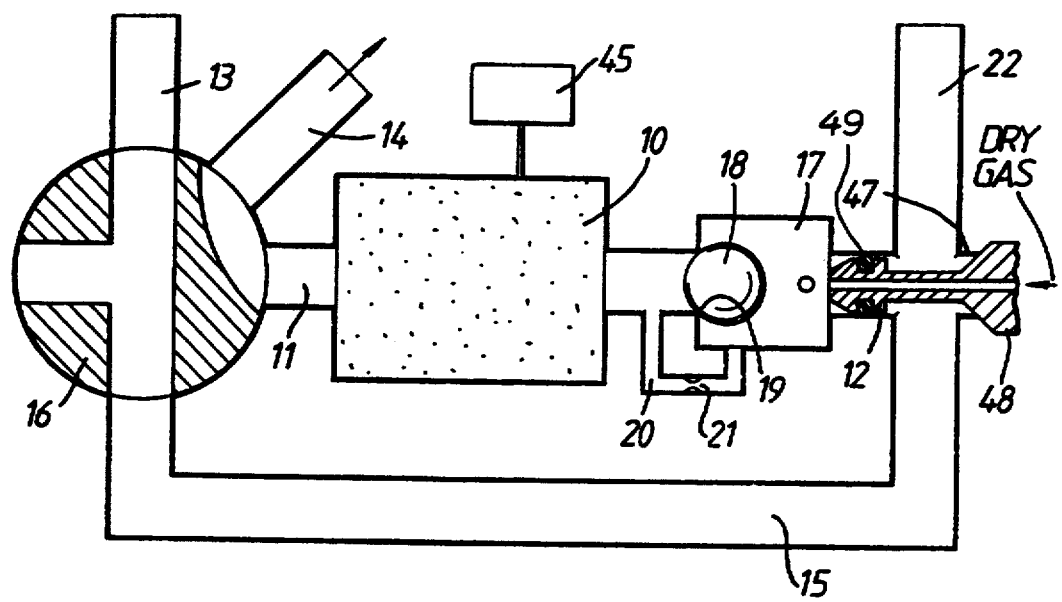
FIG. 3 is a view similar to FIGS. 1a and 1b but showing the addition of a connector for the supply of dry gas to desorb the bed.

In FIG. 3, parts common to FIG. 3 and to FIGS. 1a and 1b are not described in detail and are given the same reference numerals.

In this case, the adsorbent bed 10 is provided with a humidity detector 45 that provides a signal indicating the humidity level of the adsorbent bed 10. In addition, a connector 47 is provided aligned with the outlet 12 to the adsorbent bed 10.

When the detector 45 indicates that the humidity in the adsorbent bed 10 is above a predetermined level, a probe 48 connected to a source of dry gas is inserted in the connector 47 and dry gas is supplied via the passage 20 to desorb the adsorbent bed 10. This is carried out with the valve in the second position shown in FIG. 1b (and in FIG. 3). The probe 48 includes a seal 49 which engages in the outlet 12 to prevent the dry gas supply backflowing through the by-pass 15 or flowing through the supply line 22.

Figure 4:
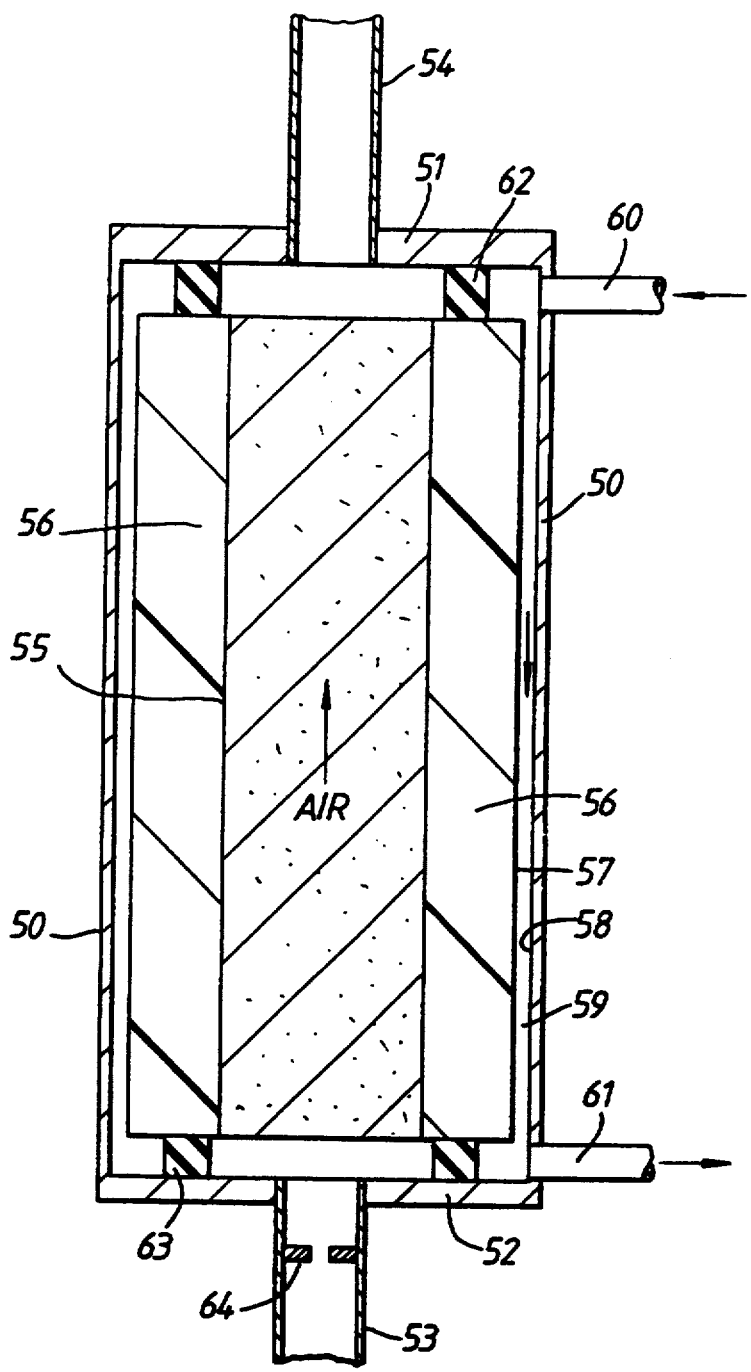
FIG. 4 is a schematic cross section of an aircraft apparatus for removing water from a mixture of water and oil and including a cylindrical adsorbent bed carried in a cylindrical casing.

Referring now to FIG. 4, the apparatus for removing water from a water/oil mixture comprises a cylindrical casing 50 closed at both ends by circular end walls 51,52. One end wall 52 includes a tubular inlet 53 co-axial with the axis of the casing 50 and the other end wall 51 includes a tubular vent 54 also co-axial with the axis of the casing.

The casing 50 may be made from any suitable material such as metal or plastics.

A cylindrical adsorbent bed 55 is mounted in the casing co-axially with the axis of the casing 50. The adsorbent bed may be of any known kind, such as the adsorbent bed shown in U.S. Pat. No. 4,687,573.

The adsorbent bed 55 is surrounded by a corrugated semi-permeable polymeric film 56. The arrangement of this polymeric film is the subject of commonly assigned U.S. Pat. No. 5,271,842. The polymeric film may be a non-porous perfluorinated film. The film has the characteristic that it selectively allows the passage of water through the film while being impermeable to and chemically stable in oil.

The cylindrical outer surface 57 of the cylindrical pleated film 56 is spaced from the cylindrical inner surface 58 of the casing to form an annular chamber 59 around the film 56. A radially extending oil/water inlet 60 leads into this chamber 59 adjacent one end wall 51 and a dry oil outlet 61 leads from the chamber 59 adjacent the other end wall 52.

Two annular seals 62,63 are provided. One seal 63 extends between the end of the adsorbent bed/film assembly 55,56 and one end wall 52 of the casing 50. The other seal 62 extends between the other end of the adsorbent bed/film assembly 55,56 and the other end wall 51 of the casing. In this way, communication between the chamber 59 and both the inlet 53 and the outlet 54 is prevented.

The inlet contains an orifice plate 64 which controls the fluid flow through the inlet 53.

In use, the casing is connected as follows. First the inlet 53 is connected to a source of aircraft ambient air. The connection includes a valve which opens the connection when the aircraft reaches a height at which dry ambient air is available and closes the connection when the aircraft descends to an altitude at which dry ambient air is no longer available. The arrangement may, for example, be as described above with reference to FIG. 2 of the drawings.

The outlet 54 is connected to any suitable ambient vent.

The oil/water inlet 60 is connected to a source of oil/water and the dry oil outlet 61 is connected to equipment within the aircraft that requires lubricant.

The flow of oil is continuous and under pressure. In general, the oil is not contaminated with water continuously; the contamination is sporadic, occurring, for example, during the descent of the aircraft when air can be drawn into the oil system components. When water is present in the oil, the film 56 allows the passage of water to the adsorbent bed 55 where it is adsorbed. The water remains in the adsorbent bed until the aircraft ascends to a height at which dry ambient air is available. The valve (e.g. the valve 16 of FIG. 2) in the connection to the ambient air inlet 53 then opens to allow dry ambient air through the inlet into the adsorbent bed 55. The orifice plate 64 controls the flow rate which may be as low as 0.5 liters per minute.

The dry ambient air flowing through the adsorbent bed 55 desorbs water from the bed which passes with the dry ambient air from the adsorbent bed to the vent 54.

When the aircraft descends to a height at which dry ambient air is no longer available, the valve (e.g. the valve 16 of FIG. 2) closes the inlet 53 and no more desorption takes place. In this way, the adsorbent bed 55 can be regenerated a substantial number of times. The adsorbent bed 55 may contain only a very small amount of desiccant, typically less than 50 grams. The regeneration system described above in which water is desorbed, may allow the arrangement to have a very long service life, possibly three or more years between routine change out.

It will be appreciated that the embodiment of FIG. 4 may be provided with a humidity detector and connector in the inlet 53 similar to the humidity detector 45 and the connector 47 described above with reference to FIG. 3 to allow the adsorbent bed 55 to be regenerated when the aircraft is on the ground.

It will be appreciated that a similar principle may be applied to the removal of odors from cabin air. In this case, the apparatus may be similar to that described above with reference to FIG. 4 but omitting the film 56. The odors are adsorbed into the adsorbent bed 55 and are desorbed by a flow of dry ambient air when the aircraft is at an altitude at which such dry ambient air is available.

We claim:

1. A method of removing in aircraft at least one specified component from a fluid mixture, the method comprising feeding the mixture to an adsorbent bed, adsorbing the at least one component in the adsorbent bed, passing the remaining fluid from the adsorbent bed and, when the aircraft reaches an altitude at which dry ambient air is available, feeding the dry ambient air to the adsorbent bed to desorb the at least one component from the bed, the air and desorbed at least one component then being vented.

2. A method according to claim 1 wherein the mixture is of water vapor and air, the adsorbent bed adsorbing the water vapor, the air then being passed to equipment within the aircraft, the dry ambient air desorbing water from the adsorbent bed.

3. A method according to claim 2 further comprising discontinuing the passage of air from the adsorbent bed to the equipment as dry ambient air is fed to the adsorbent bed while feeding further of the dry ambient air directly to the equipment without passing through the adsorbent bed.

4. A method according to claim 1 wherein the fluid mixture is of water and oil, the adsorbent bed adsorbing the water, the oil then being passed to equipment within the aircraft, and the dry ambient air desorbing water from the adsorbent bed.

5. A method according to claim 1 wherein the fluid mixture is of air and odors from the cabin of an aircraft, the adsorbent bed adsorbing the odors and the air then being returned to the cabin, the dry ambient air desorbing odors from the adsorbent bed.

6. Aircraft apparatus for removing at least one specified component from a fluid mixture and comprising an adsorbent bed for adsorbing the at least one specified component, an inlet for the fluid mixture communicating with the adsorbent bed, an outlet for passing fluid from the adsorbent bed after adsorption in the adsorbent bed, an inlet for feeding ambient air to the adsorbent bed to desorb the at least one specified component from the adsorbent bed, control means operatively associated with the ambient air inlet which permit the passage of air to the adsorbent bed to desorb the adsorbent bed when the aircraft reaches an altitude at which dry ambient air is available, and a vent for venting ambient air and desorbed component from the adsorbent bed during the passage of dry ambient air to the adsorbent bed.

7. An apparatus according to claim 6 wherein the ambient air inlet includes means regulating the flow rate of dry ambient air fed to the adsorbent bed.

8. An apparatus according to claim 7 wherein the flow rate regulating means comprise an orifice plate located in the ambient air inlet.

9. An apparatus according to claim 6 wherein the control means comprise a valve connected to an actuator, and means operating the actuator to move the valve from a first position in which a desorbing flow of ambient air to the adsorbent bed is prevented to a second position in which the desorbing flow of ambient air to the adsorbent bed is permitted at a first predetermined altitude during ascent of the aircraft at which dry ambient air is available.

10. An apparatus according to claim 9 wherein the control means include means operating the actuator to move the valve from the second to the first position at a second predetermined altitude during descent of the aircraft at which dry ambient air is no longer available.

11. An apparatus according to claim 10 wherein the actuator comprises a piston and cylinder device with the piston operatively connected to the valve and the cylinder connected to a source of fluid under pressure via a control valve, and means operating the control valve at the first predetermined altitude to connect the cylinder to the source to move the piston and so move the valve from the first to the second position the means operating the actuator when the second predetermined altitude is reached comprising the control valve operating means which, at the second predetermined altitude, connect the cylinder to vent, the piston then returning to move the valve from the second to the first position.

12. An apparatus according to claim 9 wherein the actuator comprises a piston and cylinder device with the piston operatively connected to the valve and the cylinder connected to a source of fluid under pressure via a control valve, and means operating the control valve at the first predetermined altitude to connect the cylinder to the source to move the piston and so move the valve from the first to the second position.

13. An apparatus according to claim 12 wherein the control valve operating means comprise a solenoid actuated by an altitude sensitive switch.

14. An apparatus according to claim 6 wherein the mixture is of pressurized ambient air and water vapor, a by-pass being provided for the direct passage of dry ambient air to equipment within the aircraft without passing through the adsorbent bed and the control means closing the by-pass and opening the mixture inlet when the aircraft is at an altitude at which dry ambient air is not available and opening the by-pass and closing the mixture inlet when the aircraft is at an altitude at which dry ambient air is available.

15. An apparatus according to claim 14 wherein the control means close the vent when the by-pass is closed and open the vent when the by-pass is open.

16. An apparatus according to claim 14 wherein the outlet to the adsorbent bed is connected to the by-pass and includes a check valve to prevent back flow through the adsorbent bed.

17. An apparatus according to claim 16 wherein the control means include means for connecting the inlet of the adsorbent bed to atmosphere when the by-pass is opened to provide the vent, the ambient air inlet comprising a passage communicating with the outlet and by-passing the check valve to allow a flow of desorbing dry ambient air through the adsorbent bed from the outlet to the inlet thereof via the passage by-passing the check valve.

18. An apparatus according to claim 17 including an orifice plate located in the passage by-passing the check valve for regulating the flow rate of dry ambient air fed to the adsorbent bed.

19. An apparatus according to claim 6 wherein the mixture is of oil and water, the adsorbent bed having spaced ends and an exterior surface extending between the ends, the mixture inlet passing the water/oil mixture to the exterior surface and means being provided on the surface for allowing the passage only of water from the mixture to the adsorbent bed, the dry ambient air inlet leading to one end of the adsorbent bed and the vent leading from the other end of the adsorbent bed, means being provided to prevent an oil/water mixture in passage between the mixture inlet and the oil outlet from passing to the dry ambient air inlet and the vent.

20. An apparatus according to claim 19 wherein the adsorbent bed is generally cylindrical and is coaxially located within a generally cylindrical casing closed at both ends, coaxially therewith, the mixture inlet leading to one end of an annular space between the curved inner surface of the casing and the curved exterior surface of the adsorbent bed and the oil outlet leading from an end of the annular space opposite the one end, the dry ambient air inlet extending axially into one closed end of the casing and the vent extending axially from the other closed end of the casing.

21. An apparatus according to claim 20 wherein the means for preventing passage of an oil/water mixture comprise two annular seals, each annular seal extending between a respective end of the adsorbent bed and a respective one of the closed ends of the casing at a position adjacent an outer periphery of the respective end of the adsorbent bed, to prevent flow between the annular space and both the dry ambient air inlet and the vent.

22. An apparatus according to claim 19 wherein the means for allowing only the flow of water to the adsorbent bed comprise a semi-permeable polymeric film.

23. An apparatus according to claim 6 wherein a connection is provided for the passage of gas from an exterior source through the outlet and through the adsorbent bed, to desorb the bed while the aircraft is on the ground.

24. An apparatus according to claim 23 wherein indicator means are associated with the adsorbent bed for indicating the humidity level of the adsorbent bed.

* * * * *